US008383707B2

(12) United States Patent
Ruemer

(10) Patent No.: US 8,383,707 B2
(45) Date of Patent: Feb. 26, 2013

(54) COLOURED POLYPROPYLENE COMPOSITION HAVING A HIGH CONTENT OF β-MODIFICATION

(75) Inventor: Franz Ruemer, St. Georgen/gusen (AT)

(73) Assignee: Borealis Technology Oy, Porvoo (FI)

( * ) Notice: Subject to any disclaimer, the term of this patent is extended or adjusted under 35 U.S.C. 154(b) by 190 days.

(21) Appl. No.: 12/735,459

(22) PCT Filed: Jan. 20, 2009

(86) PCT No.: PCT/EP2009/050576
§ 371 (c)(1),
(2), (4) Date: Jul. 19, 2010

(87) PCT Pub. No.: WO2009/092700
PCT Pub. Date: Jul. 30, 2009

(65) Prior Publication Data
US 2010/0286332 A1 Nov. 11, 2010

(30) Foreign Application Priority Data
Jan. 21, 2008 (EP) .................................... 08100674

(51) Int. Cl.
*C08K 5/34* (2006.01)
(52) U.S. Cl. .......... 524/90; 524/226; 524/407; 524/408; 524/413; 524/418; 524/570; 524/579; 524/582
(58) Field of Classification Search .................. 524/90, 524/226, 407, 408, 413, 418, 570, 579, 582
See application file for complete search history.

(56) References Cited

U.S. PATENT DOCUMENTS

2005/0053741 A1* 3/2005 Ebner et al. ............... 428/36.91
2008/0197620 A1* 8/2008 Spencer et al. ............ 283/81

FOREIGN PATENT DOCUMENTS

| EP | 1 312 623 A1 | 5/2003 |
| WO | WO 03/042260 A1 | 5/2003 |
| WO | WO 2006/023442 A1 | 3/2006 |

OTHER PUBLICATIONS

Dr. Hans Zweifel; Plastics Additives Handbook, 5th Edition; p. 849; Hanser Publishers, Munich & Hanser Gardner Publications, Inc., Cincinnati.
Jones, et al.; Crystalline Forms of Isotactic Polypropylene; Oct. 1963; Imperial Chemical Industries Limited; Welwyn Garden City, Herts., England.

* cited by examiner

*Primary Examiner* — Peter D Mulcahy
(74) *Attorney, Agent, or Firm* — Warn Partners, P.C.

(57) ABSTRACT

The invention relates to a colored β-nucleated polypropylene composition having a high content of β-modification, wherein the polypropylene composition comprises at least one β-nucleating agent and an inorganic blue pigment and an inorganic yellow pigment.

14 Claims, No Drawings

COLOURED POLYPROPYLENE COMPOSITION HAVING A HIGH CONTENT OF β-MODIFICATION

This application is a National Stage of International Application No. PCT/EP2009/050576, filed Jan. 20, 2009. This application claims priority to European Patent Application No. 08100674.4 filed on Jan. 21, 2008. The disclosures of the above applications are incorporated herein by reference.

The present invention relates to a coloured β-nucleated polypropylene composition, in particular to a green polypropylene composition containing inorganic pigment and having a high content of β-modification.

BACKGROUND OF THE INVENTION

Polypropylene materials are frequently used for pipes for various purposes, such as fluid transport, i.e. transport of liquid or gas, e.g. water or natural gas, during which the fluid is pressurised and/or heated. In particular, polypropylene materials are used in applications for plumbing and heating, such as in-house hot and cold water pipes and fittings, floor and wall heating systems and radiator connections.

From EP1448631 it is known to use polypropylene which crystallises predominantly in the β-modification for pressure pipes having increased long-term pressure resistance. Polypropylene which crystallises predominantly in the β-modification has an increased impact strength compared to polypropylene when it is crystallised in the α-modification. Generally, the higher the amount of β-modification, the better the impact strength of the polypropylene will be.

With regard to polypropylene pipes, impact strength of pipes is often measured by the falling weight impact test at 0° C. according to EN 1411. For pipes this is a more practice-oriented parameter, since it correlates to the resistance of the pipe against breakage during installation, especially at low temperatures.

Further, it is customary to use coloured polypropylene for these applications. A number of organic and inorganic pigments exist, which are used for the production of coloured polypropylene. However, many organic pigments are unsuitable for the production of coloured polypropylene having a high content of β-modification, because organic pigments are often acting as strong α-nucleating agents. When both α-nucleating agents and β-nucleating agents are present in a polypropylene, the α-nucleating agent is usually predominant, because the α-modification is thermodynamically more favoured than the β-modification. Inorganic pigments are favoured for the abovementioned purposes.

One of the usual colours which is used for such materials is green. Usually, the colour green is achieved by the use of specific inorganic pigments, especially the pigments C.I. Pigment Green 17, C.I. Pigment Green 26 and C.I. Pigment Green 50 (c.f. Plastics Additives Handbook, 5$^{th}$ Edition, Edited by Dr. Hans Zweifel, Carl Hanser Verlag, Munich 2001, p. 849). Chemically, C.I. Pigment Green 17 is $Cr_2C_3$. It is also identified by CAS No. 68909-79-5. Chemically, C.I. Pigment Green 26 is $CoCr_2C_4$. It is also identified by CAS No. 68187-49-5. Chemically, C.I. Pigment Green 50 is $(Co,Ni,Zn)_2Tia_4$. It is also identified by CAS No. 68186-85-6.

It was however observed, that the use of the abovementioned pigments to produce a green coloured β-nucleated polypropylene composition has the disadvantage that the impact strength (measured as falling weight impact test) is still unsatisfactory.

OBJECT OF INVENTION

It is therefore the object of the present invention to provide a green coloured β-nucleated polypropylene composition having a high content of β-modification, where pipes, which are produced from the inventive polypropylene composition shall exhibit a higher impact strength than pipes which are made from green coloured β-nucleated polypropylene compositions containing an inorganic green pigment.

Surprisingly, the above object could be achieved by a process, wherein the polypropylene composition comprises at least one β-nucleating agent and an inorganic blue pigment and an inorganic yellow pigment.

It has surprisingly been observed, that a green coloured β-nucleated polypropylene composition, which contains an inorganic blue and an inorganic yellow pigment instead of an inorganic green pigment shows a significantly improved impact strength, measured by the falling weight impact test at 0° C. according to EN 1411 on pipes.

According to a preferred embodiment of the present invention, the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8), C.I. pigment blue 29 (CAS No. 57455-37-5), C.I. pigment blue 35 (CAS No. 68187-05-3) and mixtures thereof.

The mentioned blue pigments are also listed in the table below, together with their chemical formula.

| Colour Index (C.I.) Designation | Chemical Formula | CAS Registry Number |
|---|---|---|
| C.I. pigment blue 28 | $CoAl_2O_4$ | CAS No. 68186-86-7 |
| C.I. pigment blue 36 | $Co(Al,Cr)_2O_4$ | CAS No. 68187-11-1 |
| C.I. pigment blue 36:1 | $(Zn,Co)(Cr,Al)_2O_4$ | CAS No. 74665-01-3 |
| C.I. pigment blue 72 | $(Co,Zn)Al_2O_4$ | CAS No. 68186-87-8 |
| C.I. pigment blue 29 | $Na_{6-8}Al_6Si_6O_{24}S_{2-4}$ | CAS No. 57455-37-5 |
| C.I. pigment blue 35 | $Co_2SnO_4$ | CAS No. 68187-05-3 |

According to a further embodiment of the present invention the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8) and mixtures thereof.

The aforementioned blue pigments are spinels based on $CoAl_2C_4$, where Co and/or Al can be partially replaced by other metals like Cr and/or Zn.

It has been observed, that with the use of one or more of the abovementioned spinel type inorganic blue pigments, the impact strength of the inventive green coloured β-nucleated polypropylene compositions is remarkably improved.

According to a particularly preferred embodiment of the present invention, the inorganic blue pigment is C.I. pigment blue 28 (CAS No. 68186-86-7).

It has been observed, that with the use of the abovementioned spinel type inorganic blue pigment, the impact strength of the inventive green coloured β-nucleated polypropylene compositions is most improved.

According to an embodiment of the present invention the inorganic yellow pigment is selected from the group consisting of C.I. pigment yellow 53 (CAS No. 71077-18-4), C.I. pigment yellow 119 (CAS No. 68187-51-9), C.I. pigment yellow 157 (CAS No. 68610-24-2), C.I. pigment yellow 161 (CAS No. 68611-43-8), C.I. pigment yellow 162 (CAS No. 68611-42-7), C.I. pigment yellow 163 (CAS No. 68186-92-5), C.I. pigment yellow 164 (CAS No. 68412-38-4), C.I. pigment yellow 184 (CAS No. 14059-33-7), C.I. pigment yellow 189 (CAS No. 69011-05-8) and mixtures thereof.

It has been observed, that with the use of one or more of the abovementioned inorganic yellow pigments, the impact strength of the inventive green coloured β-nucleated polypropylene compositions is remarkably improved.

The mentioned inorganic yellow pigments are also listed in the table below, together with their chemical formula.

| Colour Index (C.I.) Designation | Chemical Formula | CAS Registry Number |
| --- | --- | --- |
| C.I. pigment yellow 53 | $(Ti,Ni,Sb)O_2$ | CAS No. 71077-18-4 |
| C.I. pigment yellow 119 | $ZnFe_2O_4$ | CAS No. 68187-51-9 |
| C.I. pigment yellow 157 | $2NiO \cdot 3BaO \cdot 17TiO_2$ | CAS No. 68610-24-2 |
| C.I. pigment yellow 161 | $(Ti,Ni,Nb)O_2$ | CAS No. 68611-43-8 |
| C.I. pigment yellow 162 | $(Ti,Cr,Nb)O_2$ | CAS No. 68611-42-7 |
| C.I. pigment yellow 163 | $(Ti,Cr,W)O_2$ | CAS No. 68186-92-5 |
| C.I. pigment yellow 164 | $(Ti,Mn,Sb)O_2$ | CAS No. 68412-38-4 |
| C.I. pigment yellow 184 | $BiVO_4/(Bi,Mo,V)O_3$ | CAS No. 14059-33-7 |
| C.I. pigment yellow 189 | $(Ti,Ni,W)O_2$ | CAS No. 69011-05-8 |

According to a particularly preferred embodiment of the present invention, inorganic yellow pigment is C.I. pigment yellow 184 (CAS No. 14059-33-7).

It has been observed, that with the use of the abovementioned inorganic yellow pigment, the impact strength of the inventive green coloured β-nucleated polypropylene compositions is most improved.

Pigments, which act as α-nucleating agents should preferably be not present in the inventive polypropylene compositions at all, or only in such an amount, that they do not adversely affect the desired properties, i.e. mainly the increased content of β-modification and thus the impact strength.

The present invention is applicable to all kinds of polypropylene and polypropylene compositions comprising isotactic polypropylene. The isotacticity of polypropylene can be determined either by $^{13}$C-NMR or by Infrared spectroscopy. When it is determined by $^{13}$C-NMR, the isotacticity is determined as triade percentage (mm %) or as pentade percentage (mmmm %). For the used isotactic polypropylenes of the invention the triade percentage (mm %) is typically >80%, preferably >90%, still higher values (e.g. >95%) being still more preferred. Particularly, the present invention is applicable to polypropylenes selected from the group consisting of propylene homopolymers, propylene random copolymers, propylene heterophasic copolymers and mixtures thereof.

The polypropylene in accordance with the present invention typically has an MFR of from 0.05 to 10 g/10 min at 230° C./2.16 kg. Depending on the desired end use, the MFR may preferably be in the range of from 0.1 to 5 g/10 min and in embodiments the present invention contemplates MFR values of from 0.1 to 1 g/10 min, in particular for use in pipe applications or MFR values of from 2 to 3 g/10 min for the preparation of articles prepared by molding operations.

The polypropylene in accordance with the present invention may be prepared by using conventional catalysts, including Ziegler-Natta catalysts and single site catalysts (including metallocenes), which may be supported catalysts. Typical Ziegler-Natta catalysts are disclosed in e.g. WO 03/042260, incorporated herein by reference with respect to the description of catalyst components and polymerisation conditions.

Preparation of Polypropylenes
Production of Propylene Homopolymer and of Propylene Random Copolymer The polymerisation process for the production of the random propylene copolymers according to the invention may be a continuous process or a batch process utilising known methods and operating in liquid phase, optionally in the presence of an inert diluent, or in gas phase or by mixed liquid-gas techniques.

Accordingly, the random propylene copolymer may be produced by single- or multistage process polymerisation of propylene and α-olefin and/or ethylene such as bulk polymerisation, gas phase polymerisation, slurry polymerisation, solution polymerisation or combinations thereof using conventional catalysts. Preferably, the copolymer is made either in one or two loop reactor(s) or in a combination of loop and gas phase reactor. Those processes are well known to one skilled in the art.

The process is preferably carried out in the presence of a catalyst system which is stereospecific for polymerising isotactic polypropylene.

A suitable catalyst for the polymerisation of the propylene polymer is any stereospecific catalyst for propylene polymerisation which is capable of polymerising and copolymerising propylene and α-olefin-comonomers at a temperature of 40 to 110° C. and at a pressure from 10 to 100 bar. Ziegler Natta catalysts as well as metallocene catalysts are suitable catalysts. One skilled in the art is aware of the various possibilities to produce propylene homo- and copolymers and will simply find out a suitable procedure to produce suitable polymers which are used in the present invention, see e.g. Nello Pasquini (Ed.) Polypropylene Handbook, Hanser, Munich, 2005, pages 15-141.

The precise control of the polymerisation conditions and reaction parameters is within the state of the art. After the polymerisation in the first and the optional second reactor is finished, the polymer product is recovered by conventional procedures.

The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents, etc.

Production of propylene homopolymer may be performed in an analogous manner, with the exception, that no comonomer (ethylene) is used in the polymerisation.

Heterophasic Propylene Copolymer

A heterophasic copolymer may be produced by multistage process polymerisation of propylene and ethylene and/or an α-olefin such as bulk polymerisation, gas phase polymerisation, slurry polymerisation, solution polymerisation or combinations thereof using conventional catalysts. Those processes are also well known to one skilled in the art.

A preferred process is a combination of a bulk slurry loop reactor(s) and gas phase reactor(s). A matrix polymer can be made either in loop reactors or in a combination of loop and gas phase reactor.

The polymer produced in this way is transferred into another reactor and the disperse phase, an ethylene/α-olefin rubber, is polymerised. Preferably this polymerisation step is done in a gas phase polymerisation.

A suitable catalyst for the polymerisation of a heterophasic propylene copolymer is any stereospecific catalyst for propylene polymerisation which is capable of polymerising and copolymerising propylene and comonomers at a temperature of 40 to 110° C. and at a pressure form 10 to 100 bar. Ziegler Natta catalysts as well as metallocene catalysts are suitable catalysts.

One skilled in the art is aware of the various possibilities to produce such heterophasic systems and will simply find out a suitable procedure to produce suitable heterophasic copolymers which can be used in the present invention.

A heterophasic polyolefin composition may also be produced by mixing and melt blending a propylene homopolymer with an ethylene/α-olefin rubber.

According to the present invention, the polypropylene composition has a high amount of polypropylene crystallized in the β-modification. Preferably, the amount of β-crystallinity of the polypropylene composition is at least 60%, more preferably at least 70%, more preferably at least 75%.

Suitable types of β-nucleating agents are dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, e.g.
N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide,
N,N'-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide,
N,N'-di-$C_5$-$C_8$-cycloalkyl-terephthalamide compounds such as N,N'-dicyclohexylterephthalamide and N,N'-dicyclopentylterephthalamide,
N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.
N,N'—$C_6$-$C_{12}$-arylene-bis-benzamide compounds such as N,N'-p-phenylene-bis-benzamide and N,N'-1,5-naphthalene-bis-benzamide,
N,N'—$C_5$-$C_8$-cycloalkyl-bis-benzamide compounds such as N,N'-1,4-cyclopentane-bis-benzamide and N,N'-1,4-cyclohexane-bis-benzamide,
N,N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and
N,N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.
N-phenyl-5-(N-benzoylamino)pentaneamide and N-cyclohexyl-4-(N-cyclohexyl-carbonylamino)benzamide.

Further suitable β-nucleating agents are
quinacridone type compounds, e.g.
quinacridone, dimethylquinacridone and dimethoxyquinacridone,
quinacridonequinone type compounds, e.g.
quinacridonequinone, a mixed crystal of 5,12-dihydro(2,3b)acridine-7,14-dione with quino(2,3b)acridine-6,7,13,14-(5H,12H)-tetrone and dimethoxyquinacridonequinone and
dihydroquinacridone type compounds, e.g.
dihydroquinacridone, dimethoxydihydroquinacridone and dibenzodihydroquinacridone.

Still further suitable β-nucleating agents are
salts of dicarboxylic acids with metals of group II of the periodic table, particularly salts of dicarboxylic acids with at least 7 carbon atoms with metals from group II of the periodic table, e.g. pimelic acid calcium salt and suberic acid calcium salt; and mixtures of dicarboxylic acids and salts of metals from group IIa of periodic system.

Still further suitable β-nucleating agents are
salts of metals from group IIa of periodic system and imido acids of the formula

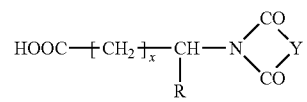

wherein $x=1$ to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g.
calcium salts of phthaloylglycine, hexahydrophthaloylglycine, N-phthaloylalanine and/or N-4-methylphthaloylglycine.

Especially suitable β-nucleating agents are any one or mixtures of N,N'-dicyclohexyl-2,6-naphtalene dicarboxamide, the β-nucleating agents of EP 177961 and those of EP 682066, the disclosure of which patent publications is incorporated herein by reference.

Preferred β-nucleating agents are N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

Such β-nucleating agents may be employed in amounts of from 0.0001 to 2.0 wt %, preferably 0.001 to 1.0 wt %, more preferably 0.003 to 0.3 wt % and most preferably 0.003 to 0.25 wt %, based on the weight of the final polypropylene composition. Preferred f3-nucleating agents selected from quinacridone pigments illustrated above preferably are used in amounts of 0.001 to 0.01 wt %, such as 0.005 wt %, while other preferred f3-nucleating agents selected among the Group II metal salts of dibasic carboxylic acids, such as pimelic acid calcium salt and suberic acid calcium salt are preferably employed in amounts of 0.05 to 0.3 wt %, such as 0.2 wt %.

It is particularly preferred for the present invention, that the β-nucleating agent comprises quino(2,3-b)acridine-6,7,13,14(5H,12H)-tetrone and 5,12-dihydro-quino(2,3-b)acridine-7,14-dione.

The polypropylene composition of the present invention may further comprise usual additives and auxiliary substances, such as up to 40 wt % of fillers, 0.01 to 2.5 wt % of stabilizers, 0.01 to 1 wt % of processing aids, and 0.1 to 1 wt % of antistatic agents.

A further object of the invention is the use of a β-nucleating agent, an inorganic blue pigment, an inorganic yellow pigment and polypropylene for producing a green coloured β-nucleated polypropylene composition having a high content of β-modification.

A still further object of the invention is a process for producing a green coloured β-nucleated polypropylene composition having a high content of β-modification. That object is achieved by melt blending polypropylene, a β-nucleating agent, an inorganic blue pigment and an inorganic yellow pigment.

The polypropylene compositions of the present invention may be produced by any one of the following methods
 a) by combining the polypropylene and the β-nucleating agent and the inorganic blue pigment and the inorganic yellow pigment and optionally additional additives in a melt mixing device and melting, homogenising and pelletising the blend. The β-nucleating agent and the inorganic blue pigment and the inorganic yellow pigment may in each case independently be employed in pure form, or preferably in the form of masterbatches. Melt mixing devices suited for this process are discontinuous and continuous kneaders, twin screw extruders and single screw extruders with special mixing sections and co-kneaders.
 b) The green coloured β-nucleated polypropylene compositions of the invention may further be produced by combining the polypropylene and the β-nucleating agent or a masterbatch comprising the β-nucleating agent and optional additives in a melt mixing device and melting, homogenising and pelletising the blend to obtain a β-nucleated polypropylene. Subsequently the β-nucleated polypropylene is combined with the inorganic blue pigment and the inorganic yellow pigment or one or more masterbatches comprising the inorganic pigment(s) and optional additives in a melt mixing device and melting, homogenising and pelletising the blend to obtain the green coloured β-nucleated polypropylene composition.
 c) The green coloured β-nucleated polypropylene compositions of the invention may further be produced by combining a green coloured polypropylene comprising an inorganic blue and an inorganic yellow pigment with a β-nucleating agent or a masterbatch comprising the β-nucleating agent and optional additives in a melt mixing device and melting, homogenising and pelletising the blend to obtain the green coloured β-nucleated polypropylene composition.
 d) The coloured β-nucleated polypropylene compositions of the invention may further be produced by combining a β-nucleated polypropylene comprising a β-nucleating agent with an inorganic blue pigment and an inorganic yellow pigment or a masterbatch comprising the inorganic pigments or more than one masterbarch comprising the inorganic yellow and blue pigment separately and optional additives in a melt mixing device and melting, homogenising and pelletising the blend to obtain the green coloured β-nucleated polypropylene composition.
 In all of the above mentioned cases the residence times must be chosen such that a sufficiently high degree of homogenisation is achieved.

In accordance therewith, the present invention provides moulded articles prepared using the green coloured β-nucleated polypropylene composition as defined herein. Preferably, the moulded article is selected among pipes, fittings and other articles required for pipe connections. Pipes as prepared from the polypropylene composition in accordance with the present invention may be employed for various purposes, in particular pipes in accordance with the present invention may be employed as hot water pipes for household applications and as pipes used for industrial purposes, such as for transporting hot and/or pressurized fluids as well as non-pressurized fluids.

Pipes made from the green coloured β-nucleated polypylene compositions of the invention can be produced with standard pipe extruders, such as single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even greater are possible.

After leaving the annular die, the pipe is taken off over a calibrating mandrel, usually accompanied by cooling of the pipe by air cooling and/or water cooling, optionally also with inner water cooling.

EXAMPLES

Measurement Methods
MFR Melt Flow Rate
 Melt flow rate (MFR) was measured according to ISO 1133, at 230° C. and with a load of 2.16 kg (MFR 2.16 kg/230° C.).
Comonomer Content
 Ethylene content in polypropylene was measured by Fourier transmission infrared spectroscopy (FTIR). A thin film of the sample (thickness approximately 250 µm) was prepared by hot-pressing. The area of —$CH_2$— absorption peak (800-650 $cm^{-1}$) was measured with Perkin Elmer FTIR 1600 spectrometer. The method was calibrated by ethylene content data measured by $^{13}C$ NMR.
Determination of β-crystallinity
 The β-crystallinity was determined by Differential Scanning Calorimetry (DSC). DSC was run according to ISO 3146/part 3/method C2 with a scan rate of 10° C./min. The amount of β-modification was calculated from the second heat by the following formula:

$$\beta\text{-area}/(\alpha\text{-area}+\beta\text{-area})$$

Since the thermodynamically instable β-modification starts to be changed into the more stable α-modification at temperatures above 150° C., a part of the β-modification is transferred within the heating process of DSC-measurement. Therefore the amount of β-PP determined by DSC is lower as when measured according to the method of Turner-Jones by WAXS (A. Turner-Jones et. al., Makromol. Chem. 75 (1964) 134).

"Second heat" means, that the sample is heated according to ISO 3146/part 3/method C2 for a first time and then cooled to room temperature at a rate of 20° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. By using the second heat for determination of β-crystallinity, it is possible to compare samples regardless of the way the samples were originally manufactured.

Pipe falling weight impact is determined according to EN 1411 on diameter 32 mm pipes with a wall thickness of 4.4 mm at 0° C. The HSO value in millimeters is calculated.
Production of the Pipes
 The pipes were produced by feeding the polypropylene composition in pellet form into a conventional Cincinnati pipe extruder for extrusion with a line speed of about 1 m/min into diameter 32 mm pipes with a wall thickness of 4.4 mm.
Used Materials
 Polymer1: random copolymer of propylene with ethylene. Ethylene content 3.6 wt %. MFR=0.2 g/10 min (2.16 kg, 230° C.).

MB1: 77.01 wt % propylene copolymer (ethylene 3.7 wt %, MFR 2.0 g/10 min)
   8.0 wt % Cobaltblue pigment blue 28 (CAS No. 1345-16-0)
   8.0 wt % Bismuthvanadate pigment yellow 184 (CAS No. 14059-33-7)
   0.25 wt % Cinquasia Gold YT-923-D (quinacridone pigment orange 48)
MB2: 77.01 wt % propylene copolymer (ethylene 3.7 wt %, MFR 2.0 g/10 min)
   16.0 wt % Co/Ni/Zn/Ti-Oxide P. Green 50 (CAS No. 68186-85-6)
   0.25 wt % Cinquasia Gold YT-923-D (quinacridone pigment orange 48)
MB3: 77.26 wt % propylene copolymer (ethylene 3.7 wt %, MFR 2.0 g/10 min)
   16.0 wt % Co/Ni/Zn/Ti-Oxide P. Green 50 (CAS No. 68186-85-6)
MB4: 99.15 wt % propylene homopolymer (MFR 10.0 g/10 min)
   0.25 wt % Cinquasia Gold YT-923-D (quinacridone pigment orange 48)

Cinquasia Gold YT-923-D (quinacridone pigment orange 48) (CAS No. 1503-48-6), which is commercially available from Ciba Specialty Chemicals, was used as β-nucleating agent in the examples.

Polymer1 contained the following additives and stabilisers:
0.25 wt % 1,3,5-tri-methyl-2,4,6-tris-(3,5-di-tert.butyl-4-hydroxyphenyl)benzene
0.25 wt % Pentaerythrityl-tetrakis(3-(3',5'-di-tert.butyl-4-hydroxyphenyl)-propionate
0.1 wt % Tris (2,4-di-t-butylphenyl)phosphite
0.03 wt % synthetic hydrotalcite (SHT)
0.07 wt % calcium stearate

TABLE 1

|  | Polymer1 [wt %] | MB1 [wt %] | MB2 [wt %] | MB3 [wt %] | MB4 [wt %] |
|---|---|---|---|---|---|
| Example1 | 98 | — | — | — | 2 |
| Example2 | 98 | — | 2 | — | — |
| Example3 | 96 | — | — | 2 | 2 |
| Example4 | 98 | 2 | — | — | — |

Table 1 shows the used amounts of the polymer and masterbatches.

TABLE 2

|  | peak 1 [° C.] | peak 2 [° C.] | HM1 [Jg⁻¹] | HM2 [Jg⁻¹] | β-content [%] | Tk [° C.] |
|---|---|---|---|---|---|---|
| Example1 | 132.3 | 147.1 | 67.5 | 15.8 | 81.0 | 106.7 |
| Example2 | 132.0 | 144.0 | 48.8 | 28.9 | 62.8 | 108.3 |
| Example3 | 133.1 | 148.4 | 55.4 | 15.4 | 78.2 | 109.8 |
| Example4 | 132.2 | 147.2 | 61.7 | 15.1 | 80.3 | 108.2 |

Table 2 shows the amounts of β-modification of the polypropylene compositions of the examples. Example 1 is not coloured, the amount of β-modification is 81.0%. Examples 2, 3 and 4 are β-nucleated green polypropylene compositions. Example2 is made by using a masterbatch which contains both the green pigment and the β-nucleating agent. The polypropylene composition of Example2 has a rather low amount of β-modification of 62.8%. Example3 is made by using separate masterbatches for the green pigment and for the β-nucleating agent. The polypropylene composition of Example3 has again an acceptable high amount of β-modification of 78.2%. Example4 is made by using a masterbatch containing both the blue and the yellow pigment as well as the β-nucleating agent. The polypropylene composition of Example4 has again an acceptable high amount of β-modification of 80.3%

TABLE 3

|  | Falling weight pipe test | | |
|---|---|---|---|
|  | min [mm] | max [mm] | H50 [mm] |
| Example 2 | 900 | 1200 | 1010 |
| Example 3 | 1700 | 2300 | 1987 |
| Example 4 | 4000 | 4200 | 4117 |

Table 3 shows the effect of the invention on the impact strength of pipes. The falling weight pipe test, performed at 0° C., yields a result which is more than double as high (H50 values) for Example4 as for Example3. This is indicative for a significantly increased impact strength.

I claim:

1. A green coloured β-nucleated polypropylene composition having a high content of β-modification, wherein the polypropylene composition comprises at least one β-nucleating agent and an inorganic blue pigment and an inorganic yellow pigment, and wherein
   (a) the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8), C.I. pigment blue 29 (CAS No. 57455-37-5), C.I. pigment blue 35 (CAS No. 68187-05-3) and mixtures thereof, and
   (b) the inorganic yellow pigment is selected from the group consisting of C.I. pigment yellow 53 (CAS No. 71077-18-4), C.I. pigment yellow 119 (CAS No. 68187-51-9), C.I. pigment yellow 157 (CAS No. 68610-24-2), C.I. pigment yellow 161 (CAS No. 68611-43-8), C.I. pigment yellow 162 (CAS No. 68611-42-7), C.I. pigment yellow 163 (CAS No. 68186-92-5), C.I. pigment yellow 164 (CAS No. 68412-38-4), C.I. pigment yellow 184 (CAS No. 1405933-7), C.I. pigment yellow 189 (CAS No. 69011-05-8) and mixtures thereof.

2. A green coloured polypropylene composition according to claim 1, wherein the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8) and mixtures thereof.

3. A green coloured polypropylene composition according to claim 1, wherein the inorganic blue pigment is C.I. pigment blue 28 (CAS No. 68186-86-7).

4. A green coloured polypropylene composition according to claim 1, wherein the inorganic yellow pigment is C.I. pigment yellow 184 (CAS No. 14059-33-7).

5. A green coloured polypropylene composition according to claim 1, wherein the polypropylene is selected from the group consisting of propylene homopolymers, propylene random copolymers, propylene heterophasic copolymers and mixtures thereof.

6. A green coloured polypropylene composition according to claim 1, wherein the at least one β-nucleating agent is selected from the group consisting of N,N'-dicyclohexyl-2,6-naphthalene dicarboxamide, 5,12-dihydro-quino (2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

7. A green coloured polypropylene composition according to claim 1, wherein the β-nucleating agent comprises quino(2,3-b)acridine-6,7,13,14(5H,12H)-tetrone and 5,12-dihydro-quino(2,3-b)acridine-7,14-dione.

8. Process for producing a green coloured β-nucleated polypropylene composition having a high content of β-modification, wherein polypropylene, a β-nucleating agent, an inorganic blue pigment and an inorganic yellow pigment are melt blended, and wherein
   (a) the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8), C.I. pigment blue 29 (CAS No. 57455-37-5), C.I. pigment blue 35 (CAS No. 68187-05-3) and mixtures thereof, and
   (b) the inorganic yellow pigment is selected from the group consisting of C.I. pigment yellow 53 (CAS No. 71077-18-4), C.I. pigment yellow 119 (CAS No. 68187-51-9), C.I. pigment yellow 157 (CAS No. 68610-24-2), C.I. pigment yellow 161 (CAS No. 68611-43-8), C.I. pigment yellow 162 (CAS No. 68611-42-7), C.I. pigment yellow 163 (CAS No. 68186-92-5), C.I. pigment yellow 164 (CAS No. 68412-38-4), C.I. pigment yellow 184 (CAS No. 1405933-7), C.I. pigment yellow 189 (CAS No. 69011-05-8) and mixtures thereof.

9. Moulded article, comprising, a green coloured β-nucleated polypropylene composition having a high content of β-modification, wherein the polypropylene composition comprises at least one β-nucleating agent and an inorganic blue pigment and an inorganic yellow pigment, and wherein
   (a) the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8), C.I. pigment blue 29 (CAS No. 57455-37-5), C.I. pigment blue 35 (CAS No. 68187-05-3) and mixtures thereof, and
   (b) the inorganic yellow pigment is selected from the group consisting of C.I. pigment Yellow 53 (CAS No. 71077-18-4), C.I. pigment yellow 119 (CAS No. 68187-51-9), C.I. pigment yellow 157 (CAS No. 68610-24-2), C.I. pigment yellow 161 (CAS No. 68611-43-8), C.I. pigment yellow 162 (CAS No. 68611-42-7), C.I. pigment yellow 163 (CAS No. 68186-92-5), C.I. pigment yellow 164 (CAS No. 68412-38-4), C.I. pigment yellow 184 (CAS No. 1405933-7), C.I. pigment yellow 189 (CAS No. 69011-05-8) and mixtures thereof.

10. Pipe, comprising, a green coloured β-nucleated polypropylene composition having a high content of β-modification, wherein the polypropylene composition comprises at least one β-nucleating agent and an inorganic blue pigment and an inorganic yellow pigment, and wherein
   (a) the inorganic blue pigment is selected from the group consisting of C.I. pigment blue 28 (CAS No. 68186-86-7), C.I. pigment blue 36 (CAS No. 68187-11-1), C.I. pigment blue 36:1 (CAS No. 74665-01-3), C.I. pigment blue 72 (CAS No. 68186-87-8), C.I. pigment blue 29 (CAS No. 57455-37-5), C.I. pigment blue 35 (CAS No. 68187-05-3) and mixtures thereof, and
   (b) the inorganic yellow pigment is selected from the group consisting of C.I. pigment yellow 53 (CAS No. 71077-18-4), C.I. pigment yellow 119 (CAS No. 68187-51-9), C.I. pigment yellow 157 (CAS No. 68610-24-2), C.I. pigment yellow 161 (CAS No. 68611-43-8), C.I. pigment yellow 162 (CAS No. 68611-42-7), C.I. pigment yellow 163 (CAS No. 68186-92-5), C.I. pigment yellow 164 (CAS No. 68412-38-4), C.I. pigment yellow 184 (CAS No. 1405933-7), C.I. pigment yellow 189 (CAS No. 69011-05-8) and mixtures thereof.

11. Process for producing a green coloured β-nucleated polypropylene composition according to claim 8, the β-nucleating agent comprises quino(2,3-b)acridine-6,7,13,14(5H,12H)-tetrone and 5,12-dihydro-quino(2,3-b)acridine-7,14-dione.

12. Process for producing a green coloured β-nucleated polypropylene composition according to claim 8, the polypropylene is selected from the group consisting of propylene homopolymers, propylene random copolymers, propylene heterophasic copolymers and mixtures thereof.

13. Process for producing a green coloured β-nucleated polypropylene composition according to claim 8, the at least one β-nucleating agent is selected from the group consisting of N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

14. Moulded article according to claim 9, the β-nucleating agent comprises quino(2,3-b)acridine-6,7,13,14(5H,12H)-tetrone and 5,12-dihydro-quino(2,3-b)acridine-7,14-dione.

\* \* \* \* \*

UNITED STATES PATENT AND TRADEMARK OFFICE
CERTIFICATE OF CORRECTION

PATENT NO. : 8,383,707 B2
APPLICATION NO. : 12/735459
DATED : February 26, 2013
INVENTOR(S) : Franz Ruemer It is certified that error appears in the above-identified patent and that said Letters Patent is hereby corrected as shown below:

In the Specifications:

Column 1
Line 53, "Cr2C3" should be --Cr2O3--.

Column 1
Line 55, "CoCr2C4" should be --COCR2O4--.

Column 1
Line 57, "Tia4" should be --TiO4--.

Column 2
Line 45, "CoAl2C4" should be --CoAl2O4--.

Column 4
Line 61, "form" should be --from--.

Column 8
Line 58, "HSO" should be --H5O--.

Signed and Sealed this
Twenty-third Day of July, 2013

Teresa Stanek Rea
*Acting Director of the United States Patent and Trademark Office*